(12) United States Patent
Denby

(10) Patent No.: US 6,761,417 B2
(45) Date of Patent: Jul. 13, 2004

(54) QUICK RELEASE ASSEMBLY

(76) Inventor: Michael L. Denby, 6643 E. Aster Dr., Scottsdale, AZ (US) 85254

( * ) Notice: Subject to any disclaimer, the term of this patent is extended or adjusted under 35 U.S.C. 154(b) by 0 days.

(21) Appl. No.: 10/285,156

(22) Filed: Oct. 31, 2002

(65) Prior Publication Data

US 2004/0084955 A1 May 6, 2004

(51) Int. Cl.[7] .................. B60B 35/00; B60B 37/00; B60B 27/00
(52) U.S. Cl. .................. 301/124.2; 301/110.5; 301/110.6
(58) Field of Search .............. 301/124.2, 124.1, 301/105.1, 109–110, 110.5, 110.6, 55, 59

(56) References Cited

U.S. PATENT DOCUMENTS

| | | | |
|---|---|---|---|
| 4,964,287 A | * 10/1990 | Gaul | 301/124.2 |
| 5,121,973 A | * 6/1992 | Phillips | 301/110.5 |
| 5,257,855 A | * 11/1993 | Nagano | 301/110.5 |
| 5,339,660 A | * 8/1994 | Fell | 301/124.2 |
| 5,567,020 A | * 10/1996 | Phillips et al. | 301/124.2 |
| 5,653,512 A | * 8/1997 | Phillips | 301/124.2 |
| 5,813,258 A | * 9/1998 | Cova et al. | 301/124.2 |
| 5,961,186 A | * 10/1999 | Phillips | 301/124.2 |
| 6,241,322 B1 | * 6/2001 | Phillips | 301/124.2 |
| 6,260,931 B1 | * 7/2001 | Stewart | 301/124.2 |
| 6,409,281 B1 | * 6/2002 | Kanehisa et al. | 301/110.5 |

* cited by examiner

Primary Examiner—S. Joseph Morano
Assistant Examiner—Jason Bellinger
(74) Attorney, Agent, or Firm—Parsons & Goltry; Michael W. Goltry; Robert A. Parsons

(57) ABSTRACT

A quick release assembly includes a pivot pin and an axle secured to the pivot pin. A cam is pivoted to the pivot pin. A stop is movable between a first position detached from the pivot pin and a second position secured to the pivot pin inhibiting pivotal movement of the cam.

23 Claims, 5 Drawing Sheets

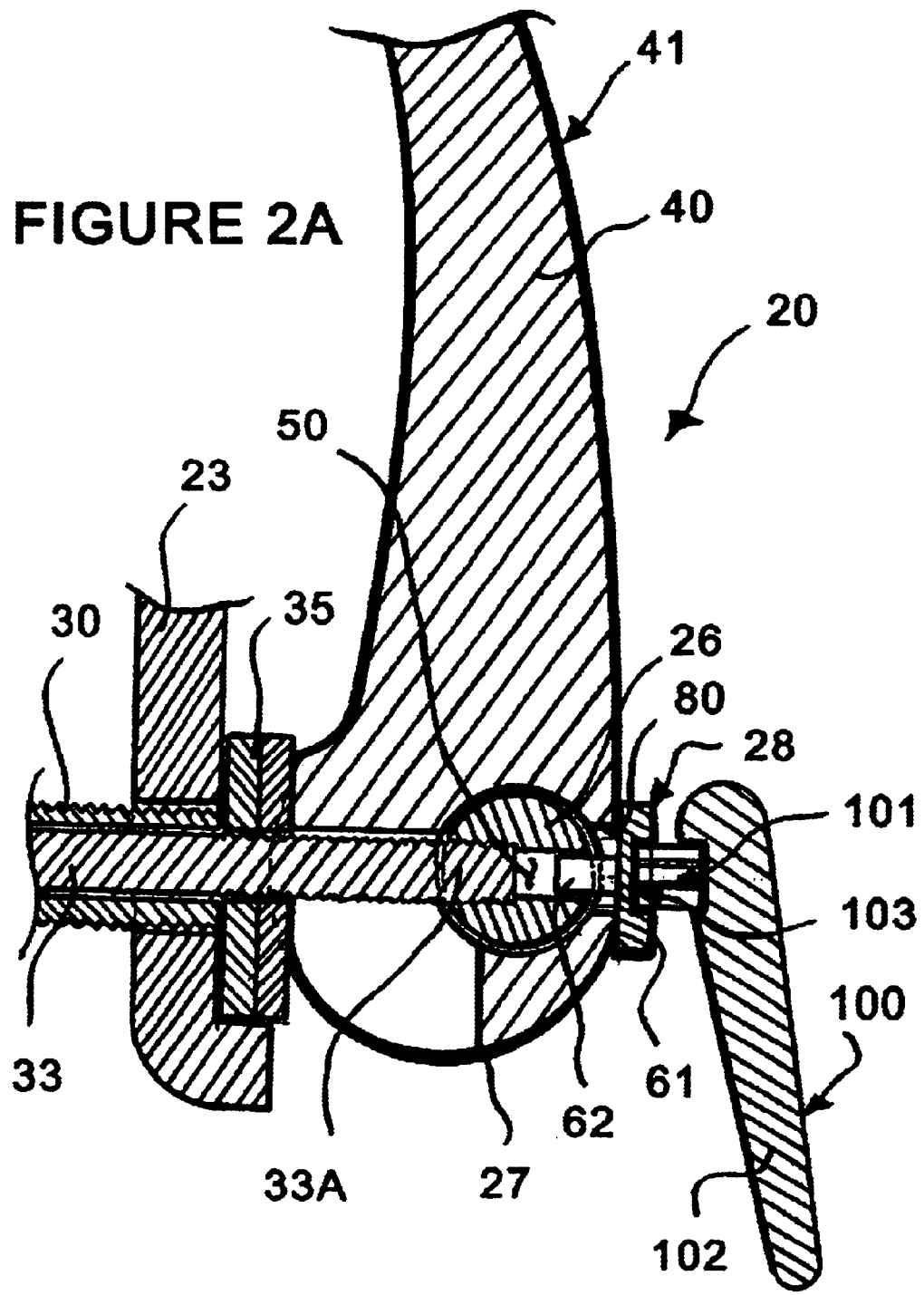

US 6,761,417 B2

QUICK RELEASE ASSEMBLY

FIELD OF THE INVENTION

This invention relates to quick release assemblies for attaching removable parts to frames and to quick release hub assemblies for bicycles.

BACKGROUND OF THE INVENTION

Many bikes incorporate wheels having hubs that are furnished with quick release assemblies that are useful for quickly attaching and detaching the wheels to and from the bicycle frame. Quick release assemblies are also utilized for seat posts and other removable components of bicycles. Most quick release assemblies incorporate a hand-operated lever that interacts with a cam, securing and releasing, for instance, the hub to and from the fork of a bicycle frame in response to operation of the lever. Because quick release assemblies allow removable components such as wheels to be removed from a bicycle frame very quickly, such removable components, especially wheels, are often stolen. Although skilled artisans have devoted considerable effort toward improving the structure and function of quick release assemblies, relatively little effort has been directed toward quick release assemblies that are designed to resist unwanted and unauthorized operation.

Thus, there is a need for a new and improved quick release assembly that is easy to make, easy to use, inexpensive and highly efficient and that incorporates unique features that prevent unwanted and unauthorized operation.

SUMMARY OF THE INVENTION

The above problems and others are at least partially solved and the above purposes and others realized in new and improved preferred embodiments of an invention that relate to a new and useful quick release assembly. One preferred embodiment of the invention consists of an axle having an end, a cam pivoted to the end of the axle, and a stop. Further to this embodiment is an engagement element carried by one of the stop and the end of the axle, and a detachably engagable complemental engagement element carried by the other of the stop and the end of the axle. The engagement element detachably secures the complemental engagement element, and the stop interacts with the cam inhibiting pivotal movement of the cam. Preferably, a handle is attached to the cam. Still further to this embodiment is a key, and a detachably engagable keyway carried by the stop. A key handle is attached to the key. It is to be understood that the positioning of the key and the keyway can be reversed, in which the keyway is carried by the key handle and the key is carried by the stop. In a particular embodiment, the axle is attached to a removable part of a bicycle. In another embodiment, the axle is attached to a hub. In one aspect of the invention, the hub is attached to a wheel. In another aspect of the invention, the hub is attached to a bicycle frame.

Another preferred embodiment of the invention consists of an axle having an end, a cam mounted to the end of the axle for pivotal movement, and a stop movable between a first position detached from the end of the axle and a second position secured to the end of the axle inhibiting pivotal movement of the cam. Further to this embodiment is a key, and a detachably engagable keyway carried by the stop. An engagement element is carried by one of the stop and the end of the axle, and a detachably engagable complemental engagement element is carried by the other of the stop and the end of the axle. Preferably, a handle is attached to the cam, and a key handle is attached to the key. It is to be understood that the positioning of the key and the keyway can be reversed, in which the keyway is carried by the key handle and the key is carried by the stop. In a particular embodiment, the axle is attached to a removable part of a bicycle. In another embodiment, the axle is attached to a hub. In one aspect of the invention, the hub is attached to a wheel. In another aspect of the invention, the hub is attached to a bicycle frame.

Yet another preferred embodiment of the invention consists of a pivot pin, an axle having an end secured to the pivot pin, a cam pivoted to the pivot pin, and a stop. Further to this embodiment is an engagement element carried by one of the stop and the pivot pin, and a detachably engagable complemental engagement element carried by the other of the stop and the pivot pin. The engagement element detachably secures the complemental engagement element, and the stop interacts with the cam inhibiting pivotal movement of the cam. Preferably, a handle is attached to the cam. Still further to this embodiment is a key, and a detachably engagable keyway carried by the stop. A key handle is attached to the key. It is to be understood that the positioning of the key and the keyway can be reversed, in which the keyway is carried by the key handle and the key is carried by the stop. In a particular embodiment, the axle is attached to a removable part of a bicycle. In another embodiment, the axle is attached to a hub. In one aspect of the invention, the hub is attached to a wheel. In another aspect of the invention, the hub is attached to a bicycle frame.

Yet still another preferred embodiment of the invention consists of a pivot pin, an axle having an end secured to the pivot pin, a cam mounted to the pivot pin for pivotal movement, and a stop movable between a first position detached from the pivot pin and a second position secured to the pivot pin inhibiting pivotal movement of the cam. Further to this embodiment is a key, and a detachably engagable keyway carried by the stop. An engagement element is carried by one of the stop and the pivot pin, and a detachably engagable complemental engagement element is carried by the other of the stop and the pivot pin. A handle is attached to the cam, and a key handle is attached to the key. It is to be understood that the positioning of the key and the keyway can be reversed, in which the keyway is carried by the key handle and the key is carried by the stop. In a particular embodiment, the axle is attached to a removable part of a bicycle. In another embodiment, the axle is attached to a hub. In one aspect of the invention, the hub is attached to a wheel. In another aspect of the invention, the hub is attached to a bicycle frame.

Consistent with the foregoing summary of preferred embodiments and the ensuing detailed description, which are to be taken together, the invention also contemplates associated apparatus and method embodiments.

BRIEF DESCRIPTION OF THE DRAWINGS

Referring to the drawings:

FIG. 2A is an enlarged vertical sectional view of the quick release assembly of FIG. 1;

DETAILED DESCRIPTION OF PREFERRED EMBODIMENTS

Figure 1:
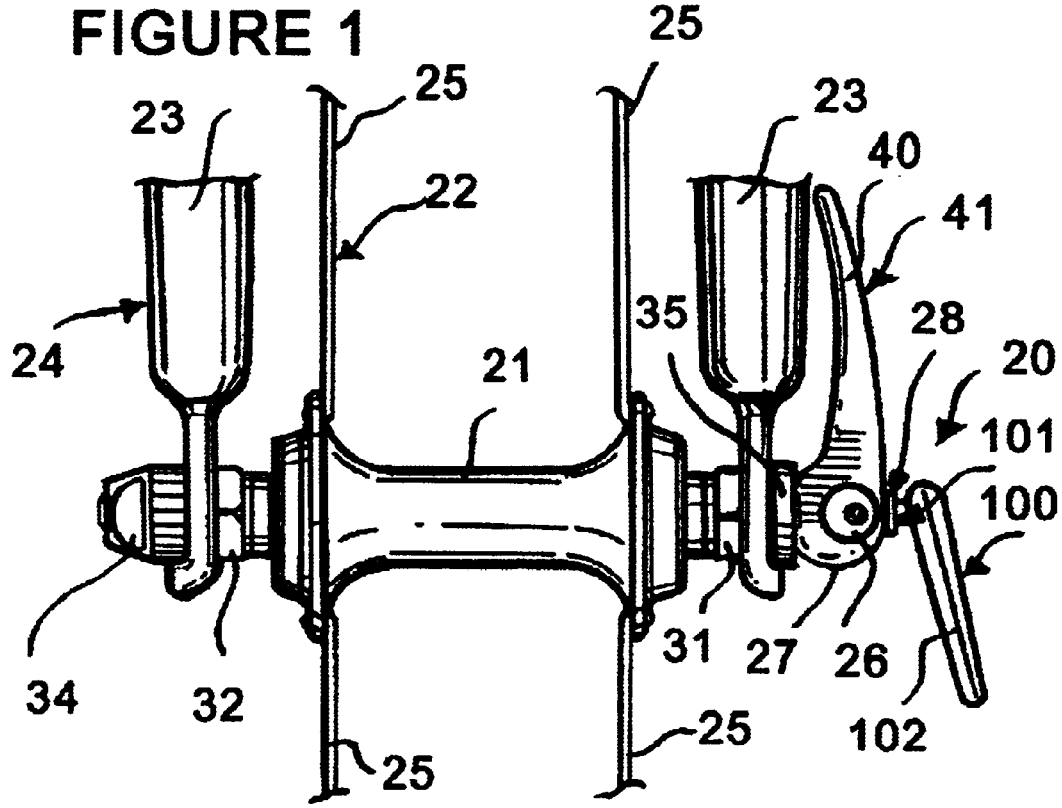
FIG. 1 is a front elevation of a quick release assembly including a pivoted cam, an attached stop inhibiting pivotal movement of the cam and a handled key engaged to the stop, in accordance with the principle of the invention, in which the quick release assembly is disposed with a hub that is attached to a wheel and to a frame, each partially depicted.

Turning now to the drawings, in which like reference characters indicate corresponding elements throughout the several views, attention is first directed to FIG. 1 in which is seen a quick release assembly 20, embodying the principle of the invention. The various parts of quick release assembly 20 are fashioned from any desired material or combination of materials, whether aluminum, titanium, plastic, etc. Assembly 20 is disposed with a hub 21 that is attached to a wheel 22 and to a fork 23 of a frame 24, each partially depicted. In FIG. 1, frame 24 is a bicycle frame of a bike, fork 23 is the front fork of frame 24 and wheel 22 is the front wheel of the bicycle. Hub 21 is attached to spokes 25 of wheel 22 in a conventional manner.

Figure 2:
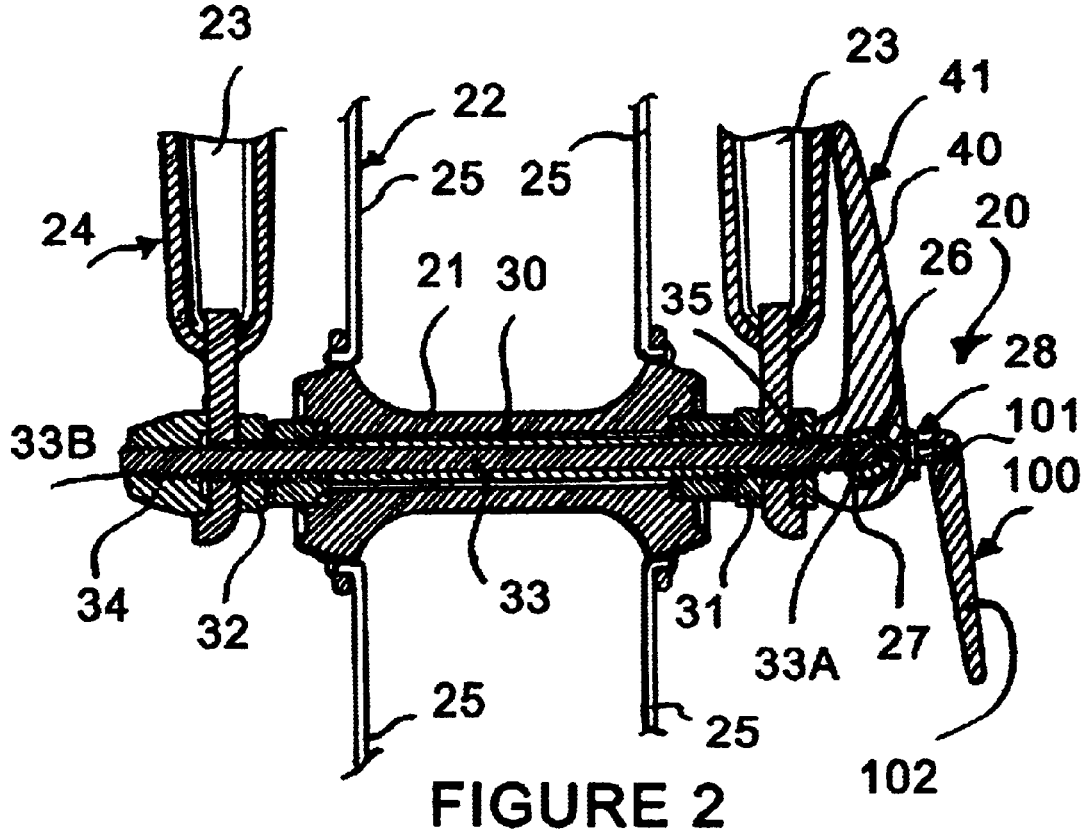
FIG. 2 is a vertical sectional view of the embodiment depicted in FIG. 1.
Figure 3:
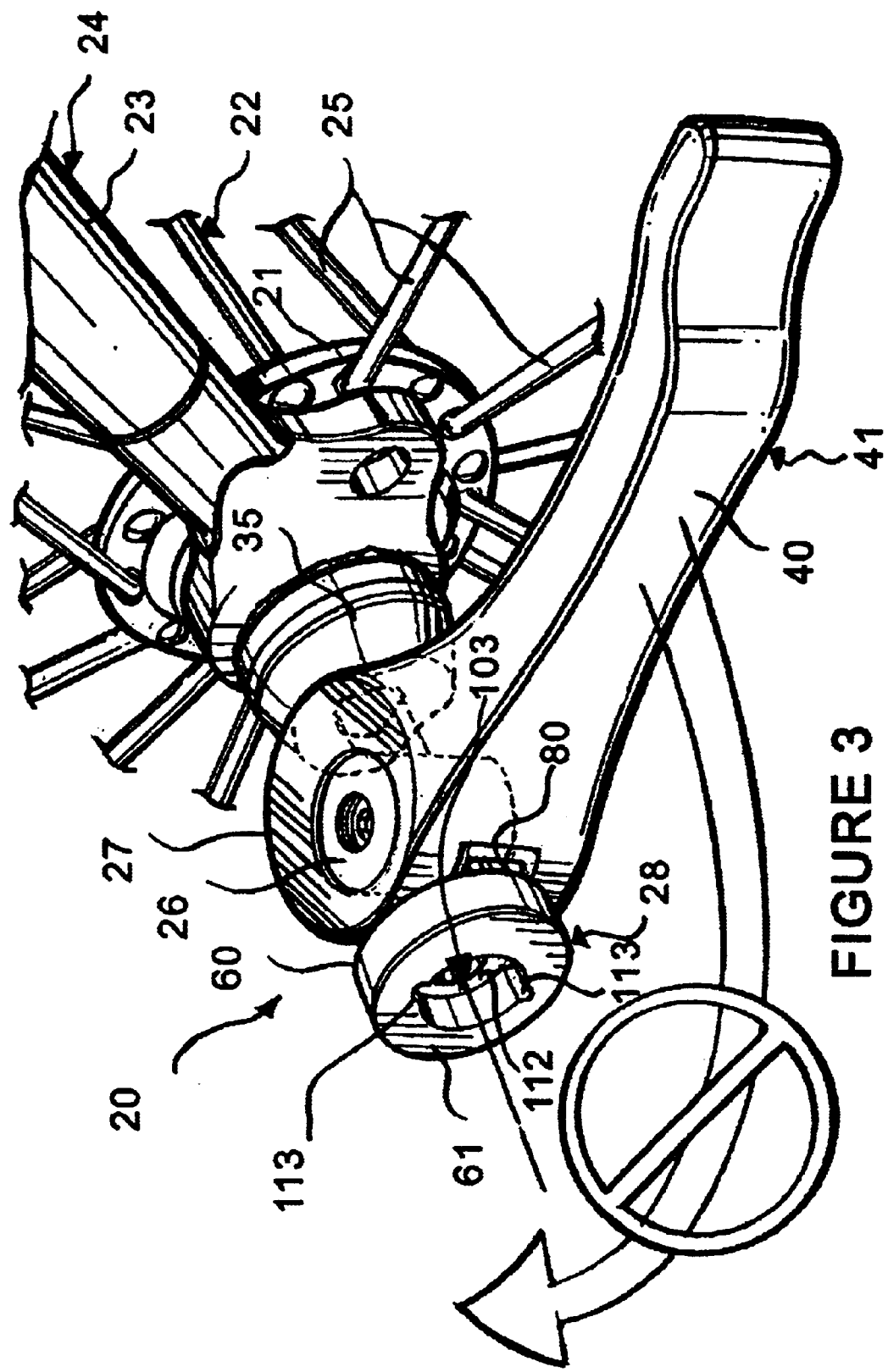
FIG. 3 is an enlarged perspective view of the quick release assembly of FIG. 1 absent the handled key.

Referring to FIG. 2 and to FIG. 2A in relevant part, assembly 20 includes a pivot element or pin 26, a cam 27 attached and pivoted to pivot pin 26, and a stop 28. It is to be understood that the illustration of stop 28 and pivot pin 26 and their attachment as shown is highly generalized and discussed in detail later in this specification. A hollow axle 30 extends through hub 21. Nuts 31,32 threadably secure axle 30 to hub 21, and assembly 20 attaches to hub 21 immediately adjacent fork 23. An axle 33 having opposing ends 33A,33B extends through hollow axle 30. End 33A, 33B of axle 33 extend slightly beyond the opposing ends of axle 30 and fork 23. End 33A of axle 33 secures pivot pin 26. Axle 33 is capable of reciprocating through axle 30 and is considered reciprocated to hub 21. Because axle 33 is reciprocated to hub 21, pivot pin 26 is also considered reciprocally mounted. A nut 34 threadably secures end 33B of axle 33 to fork 23. Cam 27 secures and pivots about pivot pin 26 between an open position and a closed position. In its closed position as shown, cam 27 presses follower 35 against fork 23, which is also illustrated in FIG. 3, and nut 34 is pulled inwardly against fork 23 by axle 33. This clamps fork 23 against nuts 31,32 between follower 35 and nut 34. As illustrated, stop 28 opposes end 33A of axle 33 and is attached and secured to pivot pin 26. The attachment of stop 28 to pivot pin 26 as illustrated in FIGS. 1–3 inhibits cam 27 from pivoting out of its closed position. When stop 28 is detached and removed from pivot pin 26, cam 27 is capable of pivoting out of its closed position and into its open position removing the clamping force applied to fork 23 against nuts 31,32 between follower 35 and nut 34.

Figure 4:
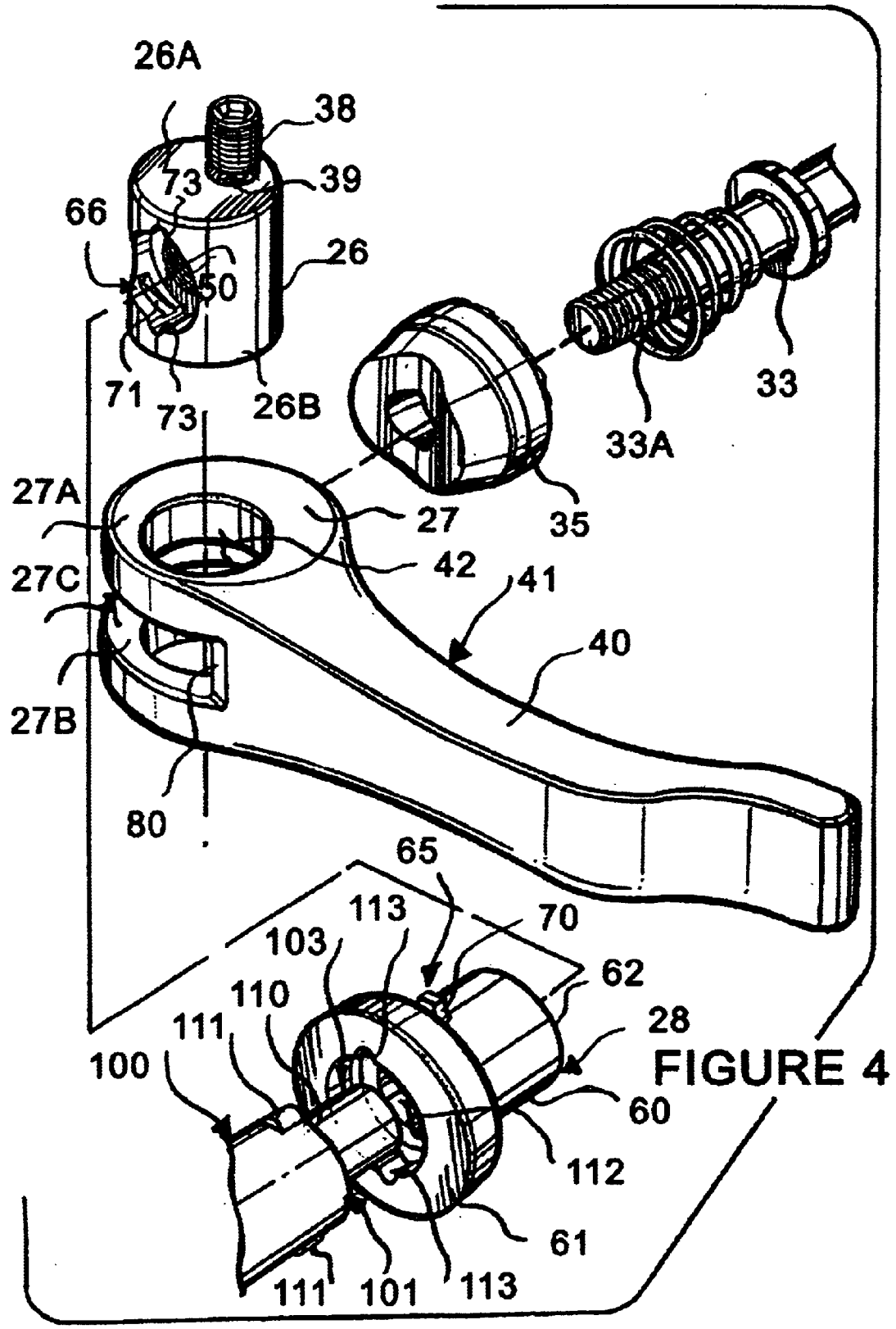
FIG. 4 is an exploded, fragmented perspective view of the quick release assembly of FIG. 1.

Turning now to FIG. 4, cam 27 has an attached handle 40, which together constitute a cam lever 41. An eccentric bore 42 extends through cam 27, and cam 27 is bifurcated, defining opposing cam extremities 27A,27B with a gap 27c therebetween. Pivot pin 26 is located at bore 42. End 33A of axle 33 extends into bore 42 through gap 27C and secures pivot pin 26. This arrangement secures cam 27 to pivot pin 26 and end 33A of axle 33. Follower 35 encircles axle 33 proximate end 33A and is disposed inboard of cam 27. When end 33A is secured to pivot pin 26, pivot pin 26 can be considered part of, or otherwise an extension of, end 33A. In shape, pivot pin is generally cylindrical, and a central bore 50 extends through pivot pin 26 between its opposing ends 26A,26B. End 33A of axle 33 extends into a proximal end of bore 50 and is secured thereto, and stop 28 is to be disposed into the opposing distal end of bore 50 and secured thereto. Preferably, end 33A threadably secures bore 50. Other ways of securing end 33A to pivot pin 26 and, moreover, to bore 50 can be used. For instance, end 33A can be welded to pivot pin 26, if desired. Pivot pin 26 and end 33A can be integrally formed, if desired. A press fitting attachment can be used to attach end 33A to bore 50. Any manner of mutually securable male and female engagement structure can be used. A snap or other desired manner of mating and secure means of attachment can be used to secure end 33A to bore 50. Consistent with the foregoing, it is to be understood that any suitable means of attachment can be used to secure end 33A to pivot pin 26 and, moreover, to bore 50. As a matter of example, FIG. 4 illustrates a threaded element 38 and a threaded bore 39 extending through end 26A to bore 50. Threaded bore 39 theadably accepts threaded element 38, which can be tightened against end 33A disposed at bore 50 for further securing end 33A to pivot pin 26.

Stop 28 consists of a body 60 having opposing ends or extremities 61,62. In accordance with the invention, stop is to be secured to pivot pin 26, preferably at bore 50. In this respect, end 62 is fashioned with an engagement element 65 and bore 50, proximate its distal end, is fashioned with a detachably engagable complemental engagement element 66. The term "element" as used in connection with engagement element 65 and with complemental engagement element 66 can constitute a single object or thing, if desired, or a plurality of objects or things, if desired, as it really makes no difference in accordance with the provisions of the invention. The provision of engagement element 65 and complemental engagement element 66 is to provide for the detachably engagement of stop 28 to pivot pin 26. In the immediate embodiment depicted in FIG. 3, engagement element 65 consists of opposing projections or protuberances 70 (only one shown) carried by body 60 proximate end 62 and complemental engagement element 66 consists of corresponding and opposing catches or recesses 71 (only one shown) carried by pivot pin 26 at bore 50. Any number of projections and corresponding recesses 71 can be used. The end of bore 50 into which end 62 is to be disposed, namely, the distal end, has a diameter that is somewhat greater than the diameter of end 62, ensuring a snug, competent fit, which is the preferred fit between bore 50 and end 62. The dimensions of bore 50 and end 62 can be provided as desired for providing any desired and selected fit between bore 50 and end 62. Opposing ways 73 are formed into pivot pin 26 at bore 50 proximate its distal end. To attach stop 28 to pivot pin 26, cam 27 is first pivoted into its closed position, in which bore 50 is revealed through gap 27C between opposing cam extremities 27A,27B. At this point, end 62 is directed between opposing cam extremities 27A,27B and into bore 50 aligning and passing projections 70 into ways 73, in which stop 28 is then rotated disposing projections 70 into the corresponding recesses 71, seizing and securing and locking stop 28 in place. Reversing the foregoing operation detaches and removes stop 28 from pivot pin 26. It is to be understood that any number of projections 70 and corresponding recesses 71 and ways 73 can be used without departing from the invention.

FIG. 2A and FIG. 3 illustrate the attachment of stop 28 to pivot pin 26. When stop 28 is so secured to pivot pin 26, in accordance with the invention, and cam 27 is disposed in its closed position, an edge/surface 80 of cam 27 confronts and interacts with stop 28 inhibiting cam 27 from moving into its open position. Detaching and removing stop 28 from pivot pin 26 removes the physical obstruction confronting edge/surface 80, permitting the movement of cam 27 from its closed position to its open position. Stop 28 and cam 27 can incorporate mating structure capable of facilitating their mutual engagement to increase the ruggedness of the attachment of stop 28, if desired.

Looking back to FIGS. 1, 2, and 2A, the invention further includes a handled key 100, which consists of a key end or simply a key 101, and an attached handle 102, which is considered a key handle. In FIGS. 1, 2, and 2A, key 101 is shown attached to stop 28. It is to be understood that the illustration of stop 28 and key 101 and their attachment as shown is highly generalized and discussed in detail presently. In accordance with a preferred embodiment, and with regard to FIG. 4, end 61 of stop 28 is fashioned with a keyway 103 that is capable of accepting key 101. This characterizes a keyed engagement. End 61 is considered a key receiving member of stop 28. To attach stop 28 to pivot pin 26 with the use of handled key 100, cam 27 is first pivoted into its closed position, in which bore 50 is revealed between opposing cam extremities 27A,27B. At this point, handled key 100 is taken up, such as by hand, and key 101 directed into keyway 103 attaching stop 28 to handled key 100 by way of a keyed engagement. By maneuvering handled key 100, end 62 is to be directed between opposing cam extremities 27A,27B and into bore 50 aligning and passing projections 70 into ways 73, in which stop 28 is then rotated by handled key 100 disposing projections 70 into the corresponding recesses 71, which seizes and secures and locks stop 28 in place, in which key 101 is then removed from keyway 103 and kept in a safe place leaving stop 28 secured to pivot pin 26. Reversing the foregoing operation detaches and removes stop 28 from pivot pin 26. When stop 28 is so secured and cam 27 is disposed in its closed position as previously described, an edge/surface 80 of cam 27 confronts stop 28. The interaction between edge/surface 80 and stop 28 inhibits cam 27 from moving into its open position and thus serves to maintain cam 27 in its closed position. In other words, in the attempt to pivot cam 27 from its closed position to its open position, edge/surface 80 will encounter stop 28, preventing cam 27 from moving from its closed position into its open position. It is to be understood that the positioning of key 101 and keyway 103 can be reversed, in which keyway 103 is carried by handle 102 and key 101 is carried by stop 28.

With continuing reference to FIG. 4, key 101 is illustrative of a specific shape and keyway 103 is illustrative of a corresponding shape specifically designed to accept key 101. In the immediate embodiment, an extremity 110 having opposing protuberances or projections 111 characterizes key 101, and a corresponding recess or blind bore 112 extending into end 61 of stop 28 and opposing ways 113 formed into stop 28 at blind bore 112 characterizes keyway 103. To attach stop 28 to handled key 100, in accordance with the immediate embodiment, extremity 110 is directed into blind bore 112 aligning and passing projections 111 into ways 112. Reversing the foregoing operation detaches and removes stop 28 from handled key 100. Key 101 and keyway 103 essentially represent a male/female key arrangement. Although it hardly seems worth mentioning, it is to be understood that key 101 and keyway 103 can embody a potentially infinite variety of complementing shapes capable of facilitating a mutual keyed engagement and interaction, such as mutually engagable angled surfaces, snap key arrangements and other key arrangements incorporating one or more biased elements, any of various keyed arrangements commonly found in connection with conventional keyed locks such as keyed deadbolts, etc.

As previously mentioned, the attachment of stop 28 to pivot pin 26 (see FIGS. 1, 2, 2A, and 3) in the closed position of cam 27 inhibits cam 27 from moving into its open position. This is beneficial, because it prevents the removal of a removable part from another part by use of cam 27, such as hub 21 and wheel 22 from fork 23 of frame 24. In this vein, only by first removing stop 28 can cam 27 be moved into its open position facilitating the release of a removable part to another part. End 61 has a relatively small constitution, making it difficult to apply an external forcible impulse, such by hand, sufficient to cause its removal. In this regard, removal of stop 28 is effected primarily by way of handled key 100. This, in accordance with the objects and advantages of the invention, is intended to frustrate would-be thieves in their attempt to detach a removal part secured to another part with assembly 20, such as hub 21 and wheel 22 from fork 23 of frame 24. In other words, without handled key 100, which is intended to be stored in a secret or safe location by an authorized user, removal of stop 28 is difficult and frustrating, which difficulty and frustration is intended to frustrate would-be thieves. Consistent with this disclosure, it is to be understood that stop 28, including end 61, can be constructed of any desired size and shape, and that end 61 can be designed to project outboard of cam 27 as illustrated herein, or be disposed somewhat inboard of cam 27 at the space between cam extremities 27A,27B. The instruction provided by stop 28 is its attachment to pivot pin 26 in providing an obstruction preventing the movement of cam 27 from its closed position to its open position.

Figure 5:
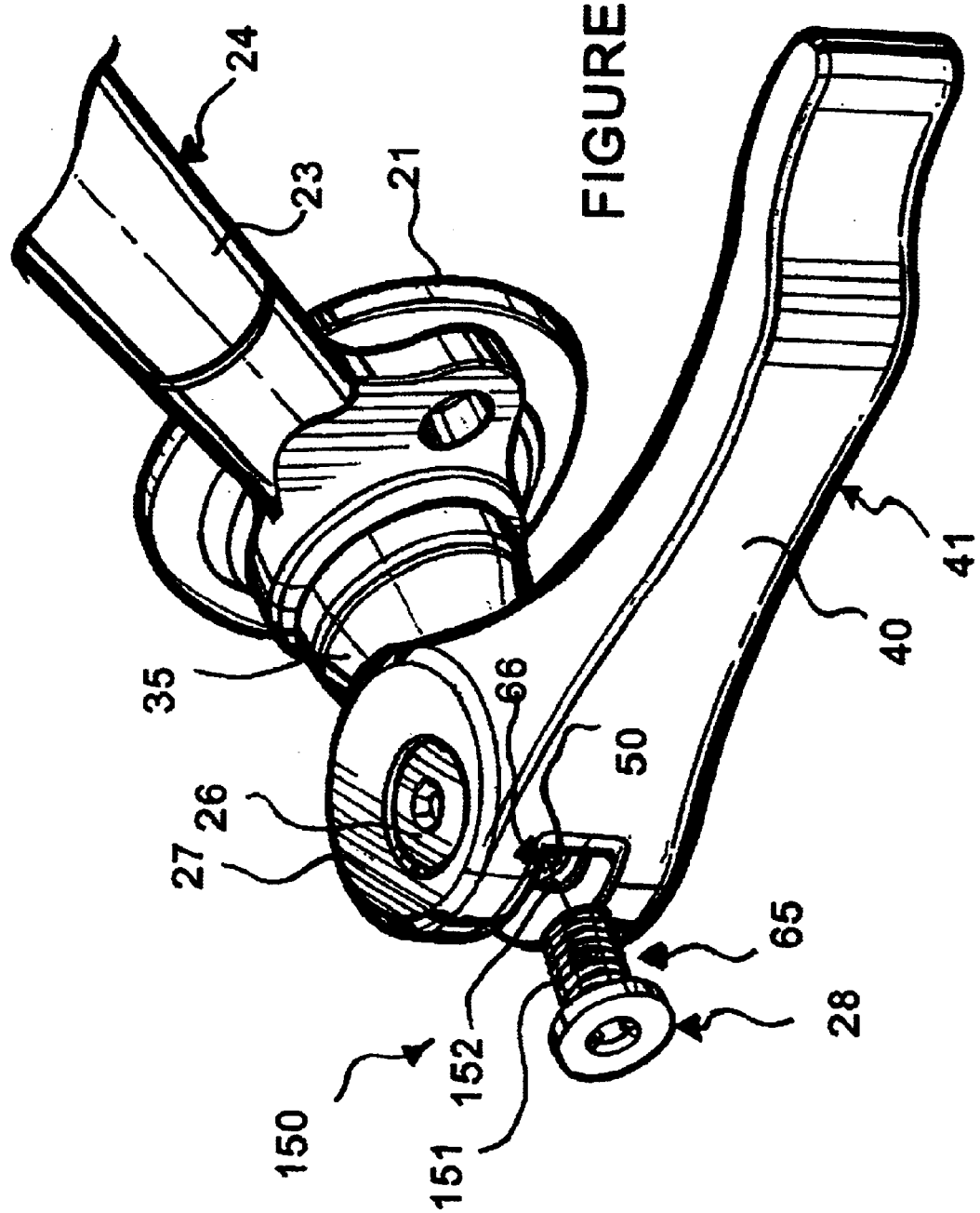
FIG. 5 is an enlarged perspective view of an alternate embodiment of a quick release assembly, constructed and arranged in accordance with the principle of the invention.

The specific disclosed combination of engagement element 65 and complemental engagement element 66 is illustrative of just one of a potentially vast number of ways of detachably securing stop 28 to pivot pin 26. It is to be understood that various combinations of engagement and complemental engagement elements, whether associated with bore, can be used for facilitating the detachable engagement of stop 28 to pivot pin 26, such as any one of various detachably engagable male/female engagement pairs, mutual snap fasteners and other arrangements incorporating one or more biased elements, mutual hook-type fasteners or other various forms of complementing fastening pairs, threaded fastening structure, etc. In an effort to illustrate this, attention is now directed to FIG. 5, which illustrates another embodiment of a quick release assembly generally designated at 150. In common with the previously described embodiment designated 20, the immediate embodiment shares pivot pin 26 including bore 50, etc., and cam lever 41 including handle 40 and cam 27, and stop 28 including engagement element 65 and detachably engagable complemental engagement element 66. In the instant embodiment, engagement element 65 is a threaded element 151 and detachably engagable complemental engagement element 66 is a complemental threaded element 152. Also, complemental engagement element 66 can be disposed at other locations along the extent of pivot pin 26 and even exteriorly, if desired.

This specification discloses preferred embodiments of the invention. Those skilled in the art will recognize that although the various preferred embodiments of the invention are particularly useful in connection with bicycle wheels, they can be used for securing other removable parts of a bicycle, namely, bicycle seats to seat posts, seat posts to bicycle frames, etc. Those skilled in the art will further recognize that changes and modifications may be made to the described embodiments without departing from nature and scope of the invention and that the positioning of engagement and complemental engagement pairs can be reversed. Accordingly, any such changes and modifications to the preferred embodiments are intended to be included within the scope of the invention as assessed only by a fair interpretation of the ensuing claims.

What is claimed is:

1. Apparatus comprising:
   an axle having an end;
   a cam mounted to the end of the axle for pivotal movement;
   a stop capable of being secured to the end of the axle inhibiting pivotal movement of the cam;
   a key; and
   a detachably engagable keyway;
   wherein the stop carries one of the key and the keyway.

2. Apparatus of claim 1, further comprising:
   an engagement element carried by one of the stop and the end of the axle; and
   a detachably engagable complemental engagement element carried by the other of the stop and the end of the axle.

3. Apparatus of claim 1, further comprising a handle attached to the cam.

4. Apparatus of claim 1, further comprising a handle attached to the other of the key and the keyway.

5. Apparatus of claim 1, wherein the axle is attached to a removable part of a bicycle.

6. Apparatus of claim 1, wherein the axle is attached to a hub.

7. Apparatus of claim 6, wherein the hub is attached to a wheel.

8. Apparatus of claim 6, wherein the hub is attached to a bicycle frame.

9. Apparatus comprising:
   a pivot pin;
   an axle having an end secured to the pivot pin;
   a cam pivotally attached to the pivot pin;
   a stop;
   an engagement element carried by one of the stop and the pivot pin;
   a detachably engagable complemental engagement element carried by the other of the stop and the pivot pin;
   the engagement element detachably securing the complemental engagement element;
   the stop inhibiting pivotal movement of the cam;
   a key; and
   a detachably engagable keyway;
   wherein the stop carries one of the key and the keyway.

10. Apparatus of claim 9 further comprising a handle attached to the cam.

11. Apparatus of claim 9, further comprising a handle attached to the other of the key and the keyway.

12. Apparatus of claim 9, wherein the axle is attached to a removable part of a bicycle.

13. Apparatus of claim 9, wherein the axle is attached to a hub.

14. Apparatus of claim 13, wherein the hub is attached to a wheel.

15. Apparatus of claim 13, wherein the hub is attached to a bicycle frame.

16. Apparatus comprising:
    a pivot pin;
    an axle having an end secured to the pivot pin;
    a cam mounted to the pivot pin for pivotal movement;
    a stop capable of being secured to the pivot pin inhibiting pivotal movement of the cam;
    a key; and
    a detachably engagable keyway;
    wherein the stop carries one of the key and the keyway.

17. Apparatus of claim 16, further comprising:
    an engagement element carried by one of the stop and the pivot pin; and
    a detachably engagable complemental engagement element carried by the other of the stop and the pivot pin.

18. Apparatus of claim 16, further comprising a handle attached to the cam.

19. Apparatus of claim 16, further comprising a handle attached to the other of the key and the keyway.

20. Apparatus of claim 16, wherein the axle is attached to a removable part of a bicycle.

21. Apparatus of claim 16, wherein the axle is attached to hub.

22. Apparatus of claim 21, wherein the axle is attached to a wheel.

23. Apparatus of claim 21, wherein the axle is attached to a bicycle frame.

* * * * *